(12) United States Patent
Klaus-Nietrost et al.

(10) Patent No.: US 11,987,906 B2
(45) Date of Patent: May 21, 2024

(54) METHOD OF REUSING A MIXED TEXTILE COMPRISING CELLULOSE AND SYNTHETIC PLASTIC

(71) Applicant: LENZING AKTIENGESELLSCHAFT, Lenzing (AT)

(72) Inventors: Christoph Klaus-Nietrost, Vöcklabruck (AT); Richard Herchl, Ried im Innkreis (AT); Christian Weilach, Vöcklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 980 days.

(21) Appl. No.: 16/962,498

(22) PCT Filed: Jan. 14, 2019

(86) PCT No.: PCT/EP2019/050744
§ 371 (c)(1),
(2) Date: Jul. 15, 2020

(87) PCT Pub. No.: WO2019/138094
PCT Pub. Date: Jul. 18, 2019

(65) Prior Publication Data
US 2021/0079564 A1 Mar. 18, 2021

(30) Foreign Application Priority Data
Jan. 15, 2018 (EP) ..................................... 18151684

(51) Int. Cl.
*D01F 13/02* (2006.01)
*B29B 17/04* (2006.01)
(Continued)

(52) U.S. Cl.
CPC .............. *D01F 13/02* (2013.01); *B29B 17/04* (2013.01); *D01F 2/08* (2013.01); *D01F 2/22* (2013.01); *D01F 13/04* (2013.01)

(58) Field of Classification Search
CPC .... B23K 35/361; B23K 35/362; B29B 17/04; C01F 7/54; D01F 13/02; D01F 13/04;
(Continued)

(56) References Cited

U.S. PATENT DOCUMENTS

| 3,801,273 A | 4/1974 | Mays |
| 3,937,671 A | 2/1976 | Gruntfest et al. |

(Continued)

FOREIGN PATENT DOCUMENTS

| CN | 102199310 A | 9/2011 |
| CN | 102250379 A | 11/2011 |

(Continued)

OTHER PUBLICATIONS

Japanese Office action for Application No. 2020-536943, dated Jan. 13, 2023, 10 pages.
(Continued)

*Primary Examiner* — Frances Tischler
(74) *Attorney, Agent, or Firm* — Lewis Roca Rothgerber Christie LLP

(57) ABSTRACT

A method of recycling a mixed textile, wherein the method comprises: i) supplying the mixed textile, wherein the mixed textile comprises cellulosic fibers and synthetic fibers, wherein the synthetic fibers comprise at least one synthetic plastic, ii) at least partially depleting the synthetic plastic from the cellulose, and iii) further processing the depleted mixed textile after depleting.

12 Claims, 3 Drawing Sheets

(51) Int. Cl.
*D01F 2/08* (2006.01)
*D01F 2/22* (2006.01)
*D01F 13/04* (2006.01)

(58) Field of Classification Search
CPC ..... D01F 2/00; D01F 2/06; D01F 2/08; D01F 2/22; Y02P 20/582; Y02P 70/62; Y02W 30/62
See application file for complete search history.

(56) References Cited

U.S. PATENT DOCUMENTS

| | | | |
|---|---|---|---|
| 4,246,221 | A | 1/1981 | McCorsley |
| 4,345,039 | A | 8/1982 | Cowan et al. |
| 5,240,530 | A | 8/1993 | Fink |
| 5,598,980 | A | 2/1997 | Dilly-Louis et al. |
| 5,601,767 | A | 2/1997 | Firgo et al. |
| 5,722,603 | A | 3/1998 | Costello et al. |
| 6,258,304 | B1 | 7/2001 | Bahia |
| 2015/0329771 | A1 | 11/2015 | Danielec et al. |

FOREIGN PATENT DOCUMENTS

| | | | |
|---|---|---|---|
| CN | 105525376 A | | 4/2016 |
| CN | 106146877 A | | 11/2016 |
| CN | 107245161 A | | 10/2017 |
| DE | 44 09 335 A1 | | 9/1994 |
| DE | 198 82 319 T1 | | 7/2000 |
| DE | 696 18 988 T2 | | 9/2002 |
| EP | 0 205 346 B1 | | 12/1986 |
| EP | 0 636 646 A1 | | 2/1995 |
| EP | 0 681 896 A1 | | 11/1995 |
| EP | 3 339 504 A1 | | 6/2018 |
| EP | 3 511 140 A1 | | 7/2019 |
| EP | 3559099 A1 | † | 10/2019 |
| JP | 2007308816 A | | 11/2007 |
| JP | 2012229209 A | | 11/2012 |
| JP | 2012254400 A | | 12/2012 |
| WO | WO 96/07778 A1 | | 3/1996 |
| WO | WO 97/021490 A2 | | 6/1997 |
| WO | WO 02/40766 A2 | | 5/2002 |
| WO | WO 2013/182801 A1 | | 12/2013 |
| WO | WO 2014/045062 A1 | | 3/2014 |
| WO | WO 2014/081291 A1 | | 5/2014 |
| WO | WO 2014/086579 A1 | | 6/2014 |
| WO | WO 2016/123643 A1 | | 8/2016 |
| WO | 2017/019802 A1 | † | 2/2017 |
| WO | WO 2017/019802 A1 | | 2/2017 |
| WO | 2018115584 A1 | | 6/2018 |

OTHER PUBLICATIONS

Chinese Office action for Application No. 201980008610.7, dated Aug. 24, 2022, 30 pages.
European Office action for Application No. 18 151 684.0-1107, dated May 30, 2023, 8 pages.
Japanese Office action for Application No. 2020-536943, dated May 30, 2023, 4 pages.
Palme, Anna, et al., "Development of an efficient route for combined recycling of PET and cotton from mixed fabrics", Textiles and Clothing Sustainability (2017) 3:4, 9 pages.
International Search Report of corresponding PCT/EP2019/050744, dated Mar. 15, 2019, 6 pages.
Witten Opinion of corresponding PCT/EP2019/050744, dated Mar. 15, 2019, 9 pages.
Search Report of corresponding EP 18151684.0, dated Jun. 29, 2018, 8 pages.
Office Action of corresponding TW application 108101358, dated Apr. 1, 2020, 21 pages with English translation.
Ouchi, et al., "A new methodology to recycle polyester from fabric blends with cellulose," Cellulose 17.1 (2010), pp. 215-222.
Golova, et al., "Structure—Properties Interrelationships in Multicomponent Solutions Based on Cellulose and Fibers Spun Therefrom," Cellulose—Fundamental Aspects, chapter 13, 2013, pp. 303-342.
Scholz, "Thermoplastisches Polyurethan," Index | FAPU 15, Nov./Dez. 2002 | Fachartikel, 4 pages.
Tausif, et al., "Mechanical Properties of Nonwoven Reinforced Thermoplastic Polyurethane Composites," Material 2017, 10, 618, 13 pages.
"Einzigartig wie ein Fingerabdruck", Markt & Technik 38/2013, 2 pages.
Zamani, et al., "Carbon Footprint of Textile Recycling: A Case Study in Sweden" Journal of Industrial Ecology, Aug. 1, 2015, p. 676-687, XP055484757.
Palme et al., Development of an efficient route for combined recycling of PET and cotton from mixed fabrics, Textiles and Clothing Sustainability (2017) 3:4.†

† cited by third party

METHOD OF REUSING A MIXED TEXTILE COMPRISING CELLULOSE AND SYNTHETIC PLASTIC

CROSS-REFERENCE TO RELATED APPLICATION

This application is a National Phase Patent Application and claims priority to and the benefit of International Patent Application No. PCT/EP2019/050744, filed Jan. 14, 2019, which claims priority to and the benefit of European Patent Application No. EP 18151684.0, filed Jan. 15, 2018, the entire contents of all of which are incorporated herein by reference.

FIELD OF INVENTION

The invention concerns a method of recycling a mixed textile and a regenerated cellulosic molded body manufactured from the mixed textile by further processing.

BACKGROUND

The invention relates to the technical field of reusing (recycling), in particular reusing mixed textiles which respectively comprise cellulose and at least one synthetic plastic. Furthermore, the invention concerns a reusing of the mixed textiles for manufacturing a regenerated cellulosic molded body, in particular wherein the cellulose of the molded body is substantially present in form of lyocell-fibers and/or viscose-fibers.

As viscose fibers, chemical fibers and regenerated fibers are denoted, which are manufactured by means of a wet spinning method which is called viscose-method. The starting raw material of the viscose-method is cellulose which is provided on the basis of wood. From this starting raw material wood, the highly pure cellulose in form of chemical pulp is obtained. In subsequent process stages, the pulp is first treated with caustic soda, whereby alkali cellulose is formed. In a subsequent conversion of said alkali cellulose with carbon disulfide, cellulose-xanthogenate is formed. From this, by further supplying caustic soda, the viscose-spinning solution is generated which is pumped through holes of shower-like spinning nozzles into a spinning bath. There, one viscose-filament per spinning nozzle hole is generated by coagulation. The such manufactured viscose-filaments are subsequently cut to viscose-staple fibers.

Lyocell denotes a regenerated fiber type comprising cellulose, which is manufactured according to a direct solvent method. The cellulose for the lyocell-method is extracted from the raw material wood. The such obtained pulp may subsequently be solved in N-methylmorpholine-N-oxide (NMMO), a solvent, by dehydration without chemical modification, filtered, and subsequently pressed through spinning nozzles. The such formed filaments, after passing an air gap, are precipitated in a bath with an aqueous NMMO-solution and are subsequently cut to staple fibers.

When using recycled materials as raw materials for the cellulose-manufacturing, frequently the problem of the purity of said starting materials occurs. These are frequently contaminated with materials which are not typical for wood. In particular, e.g. present old textiles and/or remains from the clothing manufacturing are highly contaminated with plastics. On the one hand, since they consist of plastics. On the other hand also, since today many old textiles which are mainly consisting of natural fibers, such as cellulose, are partially contaminated with plastic portions. These are elastane of elastic bands or polyester of sewing yarns, for example. In this context, textiles which comprise both cellulose and a synthetic plastic may be denoted as mixed textiles.

Previously, in recycling of starting materials, such as old textiles, in particular mixed textiles, it is attempted to remove possibly all additives and foreign matters, respectively, by means of partially complex method steps, in order to provide as "new" raw material again cellulose which is as pure as possible. These method steps may e.g. encompass: bleaching, chemically separating, and mechanically separating. These method steps are often cost-intense and elaborate. On the other hand, methods for recovering synthetic plastic, e.g. polyethylene terephthalate (PET) as raw material are known. In this connection, mainly processes are utilized in which cellulose is depleted or destroyed. For example, document WO 2014045062 A1 describes a method of extracting polyester from an object, using a solvent system.

For manufacturing cellulose for utilizing in recycling-methods which e.g. use a lyocell-method or a viscose-method, recycling-materials (starting materials) may be used. When processing these starting materials, e.g. mixed textiles, different undesired foreign matters occur when a substance cycle is closed, which have to be removed in the manufacturing of a recycled molded body, e.g. a fiber. Among others, for the purpose that the chemical/physical properties of a recycled fiber become sufficiently similar to that of a non-recycled fiber.

SUMMARY

It is an object of the present invention to recycle a mixed textile in a resource-saving and sustainable manner, such that a molded body with specific properties can be manufactured.

This object is solved by the subject-matters according to the independent patent claims. Preferred embodiments arise from the dependent patent claims.

According to an aspect of the present invention, a method of recycling a mixed textile is described. The method comprises: i) supplying the mixed textile, wherein the mixed textile comprises cellulosic fibers and synthetic fibers, wherein the synthetic fibers comprise at least one synthetic plastic, ii) at least partially depleting the synthetic plastic from the cellulose, and iii) further processing the depleted mixed textile after depleting.

According to a further aspect of the present invention, a regenerated cellulosic molded body is described which is manufactured according to the above described method. The molded body is selected from the group which is consisting of filaments, fibers, a foil, a tissue, a fleece, a (micro)sphere, beads and a sponge. Furthermore, the molded body comprises cellulose, in particular cellulose and synthetic plastic, which at least partially originates from the depleted mixed textile. Furthermore, the molded body comprises at least one of the features described below.

In the context of this application, the term "cellulose" may in particular denote an organic compound which is a component of plant cell walls or can be manufactured synthetically. Cellulose is a polysaccharide (i.e. a multiple sugar). Cellulose is unbranched and typically comprises multiple hundred up to ten thousands β-D-glucose molecules (β-1, 4-glycosidic linkage) and cellobiose-units, respectively. From cellulose molecules, cellulose fibers are built by plants in a controlled manner. By means of a technical process, cellulose molecules can be agglomerated under formation of regenerated fibers, for example as tearproof fibers.

In the context of this application, the term "molded body" may in particular denote a two-dimensional or three-dimensional geometric body which is a result of a method of manufacturing and recovery, respectively, of cellulose. In particular, a molded body denotes a two-dimensional or three-dimensional object which comprises cellulose or consists of it and is manufactured from solved pulp. Molded bodies may be in particular lyocell-molded bodies, viscose-molded bodies or modal-molded bodies. Typical molded bodies are filaments, fibers, sponges and/or films. Basically, all types of cellulose molded bodies are suitable for embodiments of the invention. Both endless filaments and cut staple fibers with conventional dimensions (for example 38 mm length) and short fibers are considered as fibers. For manufacturing fibers, both methods with withdrawing devices downstream of one or more extrusion nozzles, and also other methods, as in particular melt-blowing-methods, are possible. Alternatively to fibers, a foil which comprises cellulose can be manufactured as molded body, i.e. a planar and substantially homogenous film with or made of cellulose. Foils may be in particular manufactured by adjusting the process parameters of a lyocell-method such that coagulating is at least partially triggered only after the filaments impinge on a receiving surface. Planar cellulose molded bodies are considered as foils, wherein the thickness of these foils is adjustable (for example by selecting a number of serially arranged nozzle beams). Other embodiments of a molded body are a tissue and a fleece made of cellulose filaments and cellulose fibers, respectively, in particular a spinning fleece made of integrally merged ("merging") substantially continuous cellulose filaments ("melt blown"). Here, in particular a textile planar structure made of at least two (preferably orthogonal or almost orthogonal) crossed thread systems (or fiber systems) may be considered as a tissue, wherein threads (or fibers) in longitudinal direction may be denoted as warp threads and threads (or fibers) in a transverse direction may be denoted as weft threads. A fleece or nonwoven may be denoted as disordered (in particular present in random orientation) structure of filaments or fibers or cut yarn with limited length which are joined together to a fiber layer or a fiber web and which are connected to each other (in particular in a frictionally engaged manner). A molded body may also be created in the form of a sphere. As molded body, also cellulose-comprising particles, as in particular beads (i.e. a granulate and spherules, respectively) or flakes may be provided which can be further processed in this form. Thus, possible cellulose molded bodies are also particulate structures as granulate, spherical powder or fibrids. A shaping of a molded body is preferably performed by extrusion of a spinning solution which contains cellulose through an extrusion nozzle, since large amounts of cellulose molded bodies with a very uniform shape can be manufactured in this way. A further possible cellulose molded body is a sponge or, more general, a porous molded body. According to exemplary embodiments, the mentioned molded bodies can be used for manufacturing yarns, textiles, gels or composite materials, for example.

In the context of this application, the term "cellulose source" may in particular denote a medium (in particular a solid body medium) which, as basis for manufacturing a molded body which comprises cellulose, during a corresponding manufacturing method, provides the cellulose material used for this purpose. An example is wood and wood pulp, respectively.

In the context of this application, the term "lyocell-method" may in particular denote a method of manufacturing cellulose according to a direct solvent method. The cellulose for the lyocell-method can be obtained from a starting material which contains said cellulose. In the lyocell-method, the starting material can be solved in a suitable solvent (in particular comprising tertiary amine oxides, such as N-methylmorpholine-N-oxide (NMMO) and/or ionic liquids, i.e. low-melting salts made of cations and anions). Solving may be performed in particular by dehydration and/or without chemical modification. The obtained solution, which may be also denoted as dope or spinning solution, may subsequently be pressed through one or more spinning nozzles in the lyocell-method. Thereby formed filaments can be precipitated during and/or after their free or controlled fall through an air gap in a water containing bath (in particular in a bath with aqueous NMMO-solution) and/or in the air humidity present in the air gap.

In the context of this application, the term "viscose-method" may in particular denote a method of manufacturing cellulose according to a wet spinning method. The cellulose for the viscose-method can be obtained from a starting material (in particular wood or a wood pulp) which contains said cellulose. In subsequent process stages in the viscose-method, the starting material can first be treated with a base (for example caustic soda), whereby alkali cellulose is formed. In a subsequent conversion of said alkali cellulose with carbon disulfide, cellulose-xanthagonate is formed. From this, by a further supply of a base (in particular caustic soda), a viscose-spinning solution can be produced which can be pressed through one or more spinning nozzles. In a spinning bath, viscose-filaments are generated by coagulation.

In the context of this application, the term "remains from a clothing manufacture" may in particular denote waste and/or offcut of a textile or yarn which comprises or consists of cellulose, wherein said remains occur during a method of manufacturing clothes. In manufacture of clothing, for example a textile which comprises cellulose is manufactured as starting material, from which planar parts (for example in form of a half T-shirt) are cut. Remains are left, which can be resupplied to a method of manufacturing a molded body which comprises cellulose, according to an exemplary embodiment. Thus, remains from a clothing manufacture may be a starting material which comprises or consists of cellulose, which can be used for recovering cellulose before a consumer has used the remains as clothes or in another way. In particular, the remains from a clothing manufacture may be made of substantially pure cellulose, in particular without foreign matters which are separate and do not comprise cellulose (as buttons, textile print or seams, for example).

In the context of this application, the term "old clothes" may denote clothes, in particular comprising cellulose, which have been already used (in particular worn) by a user when at least a part of the cellulose is recovered. Thus, old clothes may be a starting material comprising cellulose which may (but does not have to) comprise a substantial amount of foreign matters and which may be used for recovering cellulose, after a user has used the old clothes as clothing or in any other way. In particular, old clothes may be made of a mixture of cellulose and one or more foreign matters, in particular comprising (in particular frequently used in clothing) synthetic plastic (as polyester and/or elastane, for example) and/or foreign matters which are separate and do not comprise cellulose (such as buttons, textile print or seams). Polyester may in particular denote polymers with ester functions (R—[—CO—O—]—R) in their main chain. Polycarbonates and polyethylene terephthalate belong to polyesters. Elastane in particular denotes an extensible chemical fiber with a high elasticity. A block copolymer which is underlying elastane may contain 85% by weight polyurethane.

In the context of the present invention, the term "mixed textile" may in particular denote a textile which comprises more than one component and consists of at least two components, respectively. Textiles may be e.g. remains from a clothing manufacturing or old clothes (see description below). A textile may consist of one component, e.g. of cotton or a synthetic plastic. In contrast, a mixed textile comprises at least two different such components. A mixed textile may comprise e.g. cotton and a synthetic plastic. Furthermore, a mixed textile may comprise cellulose, in particular cotton-cellulose, and polyester, in particular polyethylene terephthalate (PET). A mixed textile may comprise more than two components as well, for example cellulose, polyester and polyamide. According to a further example, a mixed textile may comprise (cotton)cellulose, PET, and elastane. The components may also be described as fibers. Thus, a mixed textile may comprise cellulosic fibers and synthetic fibers. The synthetic fibers may comprise at least one synthetic plastic.

In the context of this application, the term "synthetic plastic" may in particular denote a substance which is made of macromolecules and manufactured synthetically. The respective macromolecules of a plastic are polymers and thus are made of repeating basic units (repeating units). The size of the macromolecules of a polymer may vary between several thousand up to more than one million basic units. For example, the polymer polyethylene (PE) is consisting of multiply repeating ethylene units connected to each other. Here, the polymers may be unbranched, branched or crosslinked molecules. With respect to their physical properties, plastics can basically be separated into three groups: thermoplastics, duroplastics and elastomers. Furthermore, these properties may be combined in subgroups, e.g. in thermoplastic elastomers. Important features of plastics are their technical properties such as formability, strength, elasticity, fracture strength, temperature resistance, dimensional resistance under heat, and chemical resistance, which can be varied within a wide range by the selection of the macromolecules, the manufacturing method and typically by adding additives. Typical reactions for manufacturing synthetic plastic from monomers or pre-polymers are: chain polymerization, polyaddition or polycondensation. Examples for synthetic plastics which in particular are also used in textiles are e.g. polyurethane (PUR), in particular as a constituent of elastane, polyester (PE, e.g. polyethylene terephthalate (PET)), polyamide (PA, e.g. nylon, perlon) and polyether, in particular polyethylene glycol (PEG) as constituent of elastane.

In the context of this application, the term "elastane" may in particular denote a synthetic plastic which comprises thermoplastic and elastic properties. Elastane may thus be denoted as thermoplastic elastomer (TPE). Elastane may be present as block-copolymer which is in particular characterized by the following both blocks: polyurethane (PUR) and polyethylene glycol ether (PEG). Here, the PUR segments may form stiff sections which alternate with soft, elastic PEG sections. PUR may form stiff, extended sections which attach longitudinal with respect to each other and enable the cohesion of e.g. a fiber by the formation of secondary valency forces. In contrast, the rubber-like PEG blocks (e.g. respectively approximately 40 to 50 monomer units) may be present in a highly intertwined manner, wherein they nevertheless may also be extended. Here, elastane may be present as curly structure with a very high extensibility (multiple 100%, e.g. 700%). The density may be e.g. between 1.1 and 1.3 $g/cm^3$ and the strength may be 5 to 12 cN/tex, for example. The elasticity may be temperature-dependent. Furthermore, the term "elastane" may denote both elastane itself and related thermoplastic elastomers (e.g. ellastolan, desmopan, texin, utechllan).

In the context of this application, the term "depleting" may in particular denote a process by which a component is at least partially removed from a mixture of at least two components. For example, a mixed textile may comprise the components cellulose and PET. When the portion of the component PET is reduced, this may be denoted as depleting of PET. A multiplicity of possibilities for performing such a depleting are known. It may be performed mechanically, e.g. by means of a separation by density. Additionally or instead, depleting may be performed by a chemical separation. Examples for this are hydrolyzing and derivatizing the component to be depleted. Moreover, the component to be depleted may be removed by a solvent. In depleting, the component to be depleted may be degraded and destroyed, respectively. Moreover, the component to be depleted may be present in its original form, i.e. non-degraded, after depleting.

According to an exemplary embodiment of the invention, the disadvantage is overcome that, in a depleting of cellulose from a mixed textile, the cellulose is degraded more or less intensely and thus cannot be reused for subsequent methods (e.g. a lyocell-method or a viscose-method) anymore. In order to separate a synthetic plastic (for example the polyester PET) from cellulose, there are previously different methods in which cellulose is depleted or degraded.

According to an embodiment of the invention, it has now turned out, that by selectively solving and depleting, respectively, synthetic plastic (e.g. PET) from mixed textiles which comprise synthetic plastic and cellulose, both the synthetic plastic and the cellulose can be recovered in sufficiently proper quality. This may be additionally economically enabled by using mixed textiles with a lower plastic (PET)-portion.

According to an exemplary embodiment of the invention, it was surprisingly found that by a targeted control of residual concentrations in the context of a reusing of a mixed textile (inclusively the recycling process, respectively the processing of the starting material), new properties in a (lyocell-) molded body to be manufactured and its textile subsequent products, respectively, can be achieved. The such achieved functionalization of residual concentrations of a mixed textile which are based on thermoplastic plastics, may provide a multiplicity of advantageous properties, e.g. strength or elasticity.

According to an exemplary embodiment of the invention, the such achieved functionalization of residual concentrations from a mixed textile which are based on thermoplastic elastomers, such as elastane, may surprisingly allow for a efficient compensation of (negative) property changes which may in particular result from the portion of the recycled cellulose fibers in a (lyocell-) molded body to be manufactured.

According to an exemplary embodiment of the invention, synthetic plastics which are utilized in textiles in large amounts may be at least partially depleted, to obtain cellulose as raw material for a recycling method. However, completely depleting the plastic is not mandatory, but a portion which is respectively to be determined (at least partially depleting) of the synthetic plastic may remain in the mixed textile. This may, at a molded body which is to be manufactured and which comprises cellulose, lead to specifically controllable desired properties.

While previously the issue was to recover especially much synthetic plastic from textiles with a high plastic portion (wherein cellulose occurs as waste product), according to an exemplary embodiment of the invention, on the contrary, a mixed textile with a rather low plastic portion is utilized as starting material for a predominant recovery of cellulose and not for a recovery of synthetic plastic. In this way, cellulose can be efficiently recovered.

According to an advantageous embodiment, not the entire plastic has to be depleted, but a small portion may remain in the mixed textile for further processing. Surprisingly, a low residual portion of a (certain) synthetic plastic in a molded body which is to be manufactured and which comprises cellulose may not only be accepted without disturbance, but may even provide advantageous properties, such as an increased stability and/or an improved elasticity.

In summary, according to an embodiment of the invention, the circumstance is used that a mixed textile which comprises cellulose and synthetic plastic can be reused by depleting (e.g. selectively solving and depositing the polymer portions in a solvent, in particular a solvent which does not degrade cellulose) the plastic as resource-saving and sustainable cellulose-starting material. From this cellulose-starting material, e.g. by means of a lyocell-method or viscose-method, a regenerated cellulosic molded body may be manufactured.

According to an embodiment, the molded body which is manufactured from the mixed textile as starting material, e.g. by lyocell-methods or viscose-methods, may comprise desired properties due to a residual portion of a certain synthetic plastic.

In the following, additional embodiments of the method and the molded body are described.

According to an embodiment, the synthetic plastic is at least one of a group which is consisting of polyester, polyamide, polyurethane, polyether, and elastane. This may have the advantage that industry-relevant plastics which are utilized in textiles in large amounts can be at least partially depleted to obtain cellulose as starting material for a reusing. In addition, the mentioned plastics may lead to specifically controllable desired properties at a molded body which is to be manufactured and which comprises cellulose.

Examples for synthetic plastics which in particular are also used in mixed textiles are e.g. polyester (PE, e.g. polyethylene terephthalate (PET)), polyamide (e.g. nylon, perlon), polyurethane (PUR), in particular as constituent of elastane, and polyether, in particular polyethylene glycol (PEG) as constituent of elastane. According to an embodiment, in particular PET is depleted which may be present in many mixed textiles in a large amount. Additionally, larger portions of PET in a mixed textile may cause properties which are undesired for a recycling-method and for a molded body to be manufactured, respectively.

According to a further embodiment, the cellulose of the mixed textile originates from cotton. This may have to advantage that an industry-relevant substance which occurs in very large amounts in mixed textiles can be directly used. Moreover, ecological advantages are provided, since the production of cotton is very resource-intense.

A multiplicity of mixed textiles comprises cellulose in form of cotton (see the description of FIG. 5 below). This cotton-cellulose differs from lyocell-cellulose and viscose-cellulose in the phenotype and also in the physical properties. For example, cotton-cellulose fibers do not require an additional matting agent (e.g. titanium oxide), whereas lyocell-cellulose fibers and viscose-cellulose fibers may be transparent without such an agent, in particular in a wet state.

According to a further embodiment, the starting material may completely or partially comprise remains from a clothing manufacture and/or old clothes (for example mixed textiles). In other words, as at least a part of the starting material, textiles, in particular remains from a clothing manufacture and/or old clothes, may be used. Especially preferred is the utilization of remains from the clothing manufacture, since such an offcut and waste, respectively, frequently comprises a very high cellulose portion and thus a high degree of purity. In particular, such a pre-consumer-textile may be free from foreign matters, such as buttons, seams or textile print. For example, remains from the clothing manufacture may substantially comprise woven (and optionally dyed) cellulose, such that such remains may be directly transferred in solution, if desired, in order to recover cellulose by the lyocell-method. In old clothes or post-consumer-textiles, large foreign matters such as buttons, prints and seams can be separated already during or after mechanical comminuting. Other foreign matters of the remains or old clothes, such as colors and synthetic plastics (such as polyester and elastane), may be removed completely or partially before solving a corresponding starting material for forming the dope and the spinning solution, respectively, or may remain completely or partially in the spinning solution.

According to a further embodiment, the method further comprises: cleaning the cellulose, wherein the cleaning takes place between the depleting and the further processing. This may have the advantage that especially high-quality cellulose can be provided for a recycling method.

Such a cleaning may remove at least a part of the synthetic plastic, for example, if desired. For example, in this way, the portion of synthetic plastic in the molded body to be manufactured can be adjusted and influenced, respectively. The cleaning does not correspond to the actual depleting, but serves as additional method step for removing a (certain) synthetic plastic which is not firmly bound, for example, and/or for washing away plastic residues. Furthermore, the cleaning may comprise at least partially removing colorants by bleaching. Thereby it is possible to completely or partially discolor the mixed textile, for example in order to manufacture white or gray molded bodies. Moreover, the mixed textile may be at least partially freed from cross-linkers which are cross-linking fibers. In applications in which such cross-linkers are present between the fibers of the mixed textile, the fibers may be completely or partially freed from these cross-linkers by an alkaline or an acid pretreatment.

According to a further embodiment, the depleting further comprises: selectively depleting at least one synthetic plastic from the mixed textile. The synthetic plastic may be in particular one of the group which is consisting of polyamide, polyester, polypropylene, polyurethane and elastane. This may provide the advantage that plastic-portions in a mixed textile which shall be further used in a recycling-method, can be specifically influenced and controlled, respectively, in order to obtain specific properties in a molded body to be manufactured.

Certain synthetic plastics may comprise properties which are disturbing during a recycling-method, in particular a lyocell-method.

According to an exemplary embodiment, PET can be selectively depleted from the mixed textile. In this way, a processed mixed textile which is present as fragmented tissue/fiber mixture, on the one hand can be treated at temperatures of 120° C. to 190° C. with tetrahydrofuran (THF) under pressure, wherein PET is selectively solved. A polymer concentration in the solvent of maximum 10% can be adjusted, since otherwise the viscosity in a subsequent process would get to high. A filtering of the residue is then hardly possible anymore. For this variant, in particular an adapted temperature control is especially important for achieving the desired final PET-portion. In this way, the extent of the degradation can be controlled and a relatively accurate final PET-concentration can be adjusted.

According to a further exemplary embodiment, solving the PET can be achieved by solvents and the precipitating can be performed at temperatures below the melting point of PET (approximately in the range between 180° C. and 220° C.). As solvent, e.g. a dicarboxylic acid dialkyl ester or a dicarboxylic acid dialkyl ester-mixture can be used. Moreover, as solvent e.g. a dimethyl ester or a diethyl ester of oxalic acid, malonic acid, succinic acid, glutaric acid and/or adipic acid can be used. As precipitating agent, non-polar substances such as aliphatic hydrocarbons or mixtures such as petroleum ether and benzenes may be used. In particular, as precipitating agent, n-alkanes and/or iso-alkanes may be used.

According to a further exemplary embodiment, cellulose (with optional polyamide (PA) portion) is filtered and the filtrate is concentrated by distillation, such that a flowability is maintained. The concentrated solution is precipitated by introducing in liquids which are not suitable as solvent for PET, but are mixable with THF (in particular methanol, ethanol, hydrocarbons from c5 (pentane) to c10 (gasoline/diesel)). After filtration and drying, PET may be available in a fine-grained form as adequate raw material, since by the described method, no degradation of the polyester occurs.

In a mixed textile, also polypropylene (PP) may occur. This originates e.g. from non-woven portions, such as fleece lining textiles of clothes or similar materials. However, for example in a lyocell-method, PP can cause a significant disturbance of the process, since PP is insoluble in NMMO and can cause a clogging of filters in the subsequent manufacture of a lyocell-molded body.

According to an exemplary embodiment, the PP-portions can be selectively depleted by mechanical flotation (PP-density is approximately 0.75 to 0.9 kg/L, the density of the further plastics significantly above 1.0 kg/L).

If this is not successful, according to a further exemplary embodiment, PP can in advance be selectively depleted (solved) from the mixture in a first stage, by aromatic solvents (e.g. toluol, xylene, trimethylbenzene, ethylbenzene, cumene) at temperatures approximately up to 150° C. This pre-depositing variant of PP is of special interest, since cellulose, PET, PA and PUR are insoluble in the aromatic solvent. In a second stage, the PET-portion can then be reduced as described above, wherein the processes can interlock without previously completely removing the previous solvent, since the finally resulting solvent mixture may be separated by fractional distillation in a safe and proper manner.

In a further embodiment, in the old textile recycling, the primary reduction of the polymer constituents is aspired. E.g. PP can be separated (selectively depleted) by flotation methods to a high degree. Furthermore, by a hydrolysis in a pH-range of below 7, polyamides (PA) and polyacrylonitrile (PAN), respectively, can be separated (selectively depleted). By the above-described solving, finally the further polyester portions can then be selectively depleted. The upstream selecting mechanisms allow for a resource-reduction and an effort-reduction of a recycling-method, according to an embodiment of the invention.

By processing the mixed textiles according to an embodiment of the invention, it can be ensured that remaining (up to the desired degree depleted) plastics such as PUR, PA, PET, polyester etc. remain with a suitable concentration for further processing in a recycling-method, such as a lyocell-method. When this is achieved, the plastic-portions which are present in a spinning solution of a lyocell-method, may act similar as a composite system fiber-thermoplast.

In a preferred embodiment, in mixed textiles, the desired portions of e.g. PET and PUR can be adjusted by selectively depleting the present residual plastics. The recycled (lyocell-) molded body which is manufactured after adding such a processed mixed textile may in its properties be similar and almost identical, respectively, to a non-recycled lyocell-molded body. In particular, these properties can be still further approximated to the properties of a non-recycled lyocell-fiber by additionally adding recycled lyocell-tissue, whereby no difference can be determined anymore by measuring techniques.

In the described cases, the solvent can be substantially recovered by fractional distillation. Thus, the described depleting processes are especially advantageous in terms of closed substance cycles and resource usage.

According to a further embodiment, the depleting of the method further comprises: completely removing at least one synthetic plastic from the mixed textile. The synthetic plastic may in particular be polyester and/or elastane. This may have the advantage that the depleted mixed textile is present especially pure and undesired properties can thus be significantly reduced.

Several synthetic plastics, e.g. polyester (PET), elastane, or polypropylene may comprise chemical/physical properties which may be especially disturbing in a recycling-method. For example, an insolubility in a spinning solution can be considered as main problem. A depleted mixed textile which does not transfer this negative properties to a method of further processing (e.g. lyocell-method) may be correspondingly advantageous.

According to a further embodiment, the depleting of the method further comprises: at least partially retaining a synthetic plastic in the mixed textile. The synthetic plastic may in particular be one of the group which is consisting of polyamide, polyester, polyurethane, and elastane. This may have the advantage that a synthetic plastic does not have to be depleted anymore in an especially proper and pure manner, respectively. The depleting of small residual concentrations may namely be technically challenging and resource-intense.

Instead, synthetic plastic, e.g. polyurethane, may remain in the mixed textile, whereby elaborate and cost-intense depleting processes can be reduced and are not required anymore, respectively. If at least a part of the polyurethane is assigned to elastane, additionally still further advantages can be achieved, such as an improvement of the strength values and/or the elasticity of the molded body to be manufactured.

Small portions (e.g. below 2%) of e.g. polyamides and polyesters can be co-processed in the recycling-method, in order to achieve a proper integration in the cellulose. In a recycling-method, this can be a significant advantage, since at least partially removing further synthetic polymers, in particular with low concentrations, may be disproportionally elaborate. The above-mentioned further synthetic plastics may be contained in starting materials, such as textiles, very frequently and commonly. Thus, an acceptance of small residual amounts constitutes a massive facilitation of a recycling-method.

According to a further embodiment, the mixed textile comprises a first synthetic plastic, in particular polyamide and/or polyurethane. The mixed textile also comprises a second synthetic plastic, in particular polyester, further in particular polyethylene terephthalate (PET) and/or polypropylene. Additionally, the depleting further comprises: i) at least partially depleting the first synthetic plastic to a first concentration value, ii) at least partially depleting the second synthetic plastic to a second concentration value. The first concentration value is different from the second concentration value, in particular larger. This has the advantage that the technically elaborate and cost-intense depleting of a further plastic is at least partially omitted. Instead, the presence of at least one further synthetic plastic may even influence and control, respectively, the properties of the fiber to be manufactured in an advantageous manner.

For example, a high concentration of polyester, in particular PET, and/or PP may be undesired for the recycling process of the mixed textile. Moreover, the utilization of e.g. PA and/or PUR, the latter in particular as constituent of elastane, may nevertheless not necessarily be undesired. As described in this document, PA, PUR and elastane, respectively, may partially provide advantageous properties, such as the improvement of the strength of a fiber. In this way, the first concentration value may e.g. correspond to a concentration of polyester or PP, which shall be kept as low as possible. Moreover, the second concentration value may e.g. correspond to a concentration of PA or PUR, wherein a concentration in certain ranges may be advantageous. Thus, the concentration of polyester/PP may be adjusted to be as low as possible, whereas the concentration of PA/PUR can be adjusted to be higher. However, this constitutes merely an example and a multiplicity of different combinations of plastics and concentrations are possible. In this way, under consideration of the properties to be obtained of a molded body to be manufactured, a multiplicity of specific concentrations can be adjusted.

According to a further embodiment, the depleting of the method comprises at least one of the separating methods which are described in the following.

A mechanical separating, in particular due to the density-difference of the materials.

A chemical separating which comprises at least one of the group which is consisting of hydrolyzing, derivatizing, and using a solvent. According to a preferred embodiment, a solvent is used which does not decompose cellulose. For example, an alkaline boiling with caustic soda (NaOH) may be performed to degrade residual polyester and to adjust the chain length of the cellulose-molecules.

According to a further embodiment, the method further comprises: supplying at least one further mixed textile which comprises cellulose and at least one synthetic plastic, wherein the portion of synthetic plastic in the mixed textile and the further mixed textile is different, such that an obtained plastic-composition comprises at least one predetermined property. This has the advantage that substantially without additional utilization of chemical methods, the desired portions of synthetic plastic can be correspondingly adjusted and influenced, respectively.

In a preferred embodiment, residual constituents of synthetic plastic which are contained in starting materials are adjusted to a specific amount. A molded body which is manufactured after adding multiple specific starting materials and which comprises cellulose may then comprise desired plastic-concentrations and compositions, respectively, and corresponding specific chemical/physical properties. These may be properties which correspond to that of a non-recycled lyocell-fiber.

In particular, by mixing different compositions of mixed textiles and/or starting materials, such as old clothes and/or remains from the clothing manufacture, a specific property, e.g. the concentration of synthetic plastic (e.g. elastane) and optionally at least one further synthetic plastic, can be adjusted and the subsequent use and/or functionalization can be specifically controlled.

In a further preferred embodiment, different starting materials with different composition are mixed, such that the desired portions of the different plastics are adjusted. In this embodiment, a desired mixture is merely achieved by a selection of the starting materials. Thus, no additional plastics have to be added, which would have to be separately chemically pretreated. Therefore, this chemistry-reduced/chemistry-free embodiment (merely achieved by mixing of starting materials) may be considered as especially advantageous in terms of resource-consumption and due to ecological aspects.

Supplying the further mixed textile may be performed during supplying the mixed textile. Furthermore, the further mixed textile and a depleted (processed) mixed textile, respectively, may be supplied at a later point in time, e.g. during a lyocell-method.

According to a further embodiment, the further processing comprises a lyocell-method or a viscose-method for generating a regenerated cellulosic molded body. This has the advantage that a proven and robust method can be directly applied. The lyocell-method is described in detail in this document.

According to a further embodiment, the regenerated cellulosic molded body comprises at least one of the features described in the following.

The regenerated cellulosic molded body may comprise less than 0.5% polyethylene terephthalate (PET) and/or more than 1% polyurethane (PUR) and/or polyamide (PA). At least 2% of the mixed textile-portion in the regenerated cellulosic molded body may be synthetic plastic.

The regenerated cellulosic molded body comprises strength values of a conventional lyocell-fiber. Average fiber dates of a conventional lyocell fiber (e.g. TENCEL®) may be present as follows. Maximum tensile force conditioned (FFk): 40.2 cN/dtex; maximum tensile force wet (FFn): 37.5 cN/dtex, maximum tensile force extension conditioned (FDk): 13.0%, maximum tensile force extension wet (FDn): 18.4% (reference: Lenzinger Berichte 87 (2009) 98-105, table 1). The maximum tensile force (FFk) may thus be in the range from 35 to 45 cN/dtex, in particular from 38 to 42 cN/dtex, the maximum tensile force wet (FFn) may be in the range from 32 to 42 cN/dtex, in particular 35 to 40 cN/dtex. The maximum tensile force extension (FDk) may be in the range from 10% to 15% and the maximum tensile force wet (FDn) in the range from 16 to 20%.

According to an embodiment, the portion of synthetic plastic (elastane, optionally with additional portions of e.g. PET, PUR and PA) may be present in a certain concentration. This may lead to an especially homogenous distribution in a spinning solution, such that the plastic integrates in the spinning process into the (lyocell-) molded body to be manufactured in a homogenous and finely distributed manner. In this way, specific fiber properties may be correspondingly controlled and influenced, respectively.

The regenerated cellulosic molded body further comprises a reduced tendency to fibrillation compared to a conventional lyocell fiber. The surprisingly lower fibrillation tendency which is achieved in this manner may be explained with the fact, that integrated residual plastics, such as polyester-oligomers, support the sliding of the single, crystalline cellulose strains in the sense of a separating (at least partially amorphous) sliding layer and additionally control the transverse adhesion among the cellulose strains. This may cause that the fibrillation-typical delamination is correspondingly suppressed. In other words, polyester-oligomers and further synthetic plastics, respectively, act as hotmelt adhesives within the fiber. Fibrillation may in particular denote the localized separating of fibrillary elements lengthwise to the fiber axis. In particular when mechanics and humidity act on the fiber at the same time.

According to a preferred embodiment, the synthetic plastic in the molded body originates predominantly, in particular exclusively, from the mixed textile. This has the advantage, that the molded body can be manufactured in an especially resource-saving manner. The synthetic plastic in the molded body may originate completely or at least partially from the starting material. Therefore, substantially no supply of further plastic is necessary. Furthermore, also elaborately depleting the plastic from the starting material can be at least partially omitted.

According to a preferred embodiment, the concentrations of synthetic plastic, in particular polyester, in the regenerated cellulosic molded body may be in the range from 0.1 to 60 weight percent, in particular from 0.1 to 15 weight percent, with respect to the cellulose.

According to a further embodiment, the plastic concentrations of the finished (lyocell-) molded body may be detected within an accuracy of +/−0.2%.

According to an embodiment, the method may comprise a postprocessing of the precipitated cellulose for obtaining the molded body from the preform of the molded body. Such an optional postprocessing may for example comprise drying, impregnating and/or reshaping the obtained cellulose-filaments. By a corresponding postprocessing, it is possible to finish the molded body manufacture at the end of the lyocell-method in an application-specific manner.

According to an embodiment, fibers of the starting material and/or fibers of the molded body may comprise a smooth round outer surface. As illustrated in FIG. 3, cellulose fibers extracted by means of the lyocell-method are characterized by such a shape and therefore differ from other fiber shapes, as they occur in natural cotton or are obtained by a viscose-method.

The molded bodies manufactured according to the invention may be used as packaging material, fiber material, textile composite materials, fiber composite materials, fiber fleeces, needle felts, quilting cotton, tissues, knitted fabrics, as home textiles such as bedclothes, as clothes, as filling textile, flocking substance, hospital textiles such as underlays, diaper or mattresses, as fabric for heating blankets, shoe inserts and wound dressings. Embodiments of the invention may be applicable in both different technical fields and in medicine and in cosmetics and wellness. In medicine, for example materials for wound treatment and wound healing may be made of a carrier which determines the mechanical properties and a biocompatible coating material which is especially compatible with the skin and with the surface of the wound. Many other applications are possible.

BRIEF DESCRIPTION OF THE DRAWINGS

In the following, exemplary embodiments of the present invention are described in detail with reference to the following figures.

DETAILED DESCRIPTION

Figure 1:
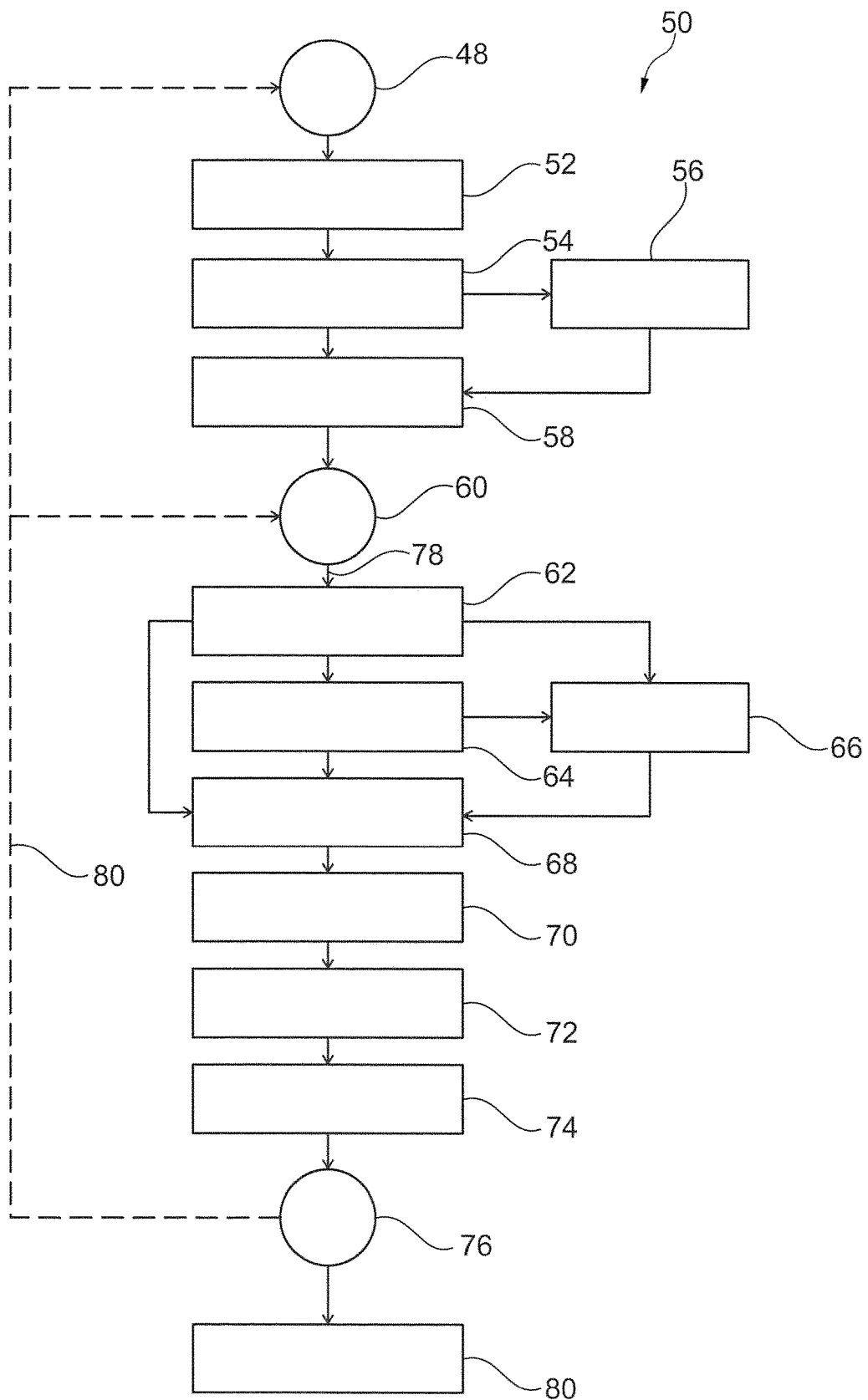
FIG. 1 shows a flow diagram of a method of recycling a mixed textile, wherein a regenerated cellulosic molded body is manufactured, according to an exemplary embodiment of the invention.

Same or similar components in different figures are provided with the same reference numbers.

Before, referring to the figures, exemplary embodiments are described, some basic considerations shall be summarized based on which exemplary embodiments of the invention have been derived.

According to an exemplary embodiment of the invention, a selective depleting of thermoplastic additives in mixed textiles is performed, such that they can be reused for the manufacture of a (lyocell-) molded body. PET-portions are highly reduced and PUR-portions are slightly reduced. The circumstance is used, that residual constituents of PUR in the context of the lyocell-method may serve as positive property-changers.

According to a further exemplary embodiment of the invention, a recycling of cellulose from mixed tissues (mixed textiles) with polymer-portions is performed by selectively solving and depositing the polymer-portions in a solvent which does not attack the cellulose.

According to a further exemplary embodiment of the invention, by the recovery of cellulose, a new solution concept is suggested, which is based on a typically lower (<50%) polymer-portion in a starting material (mixed textile). The execution of the invention is optimal, e.g. when it is a matter to deplete polymer-portions below 30% to values in the single-digit percentage range (at the most per mill range). This is in particular especially advantageous, since, in contrast to the known methods, the focus is not on the recycling of the plastics, but on the recycling of the non-polymeric residual constituents, in particular cellulose. On the contrary, previously known methods are based on the fact that the substances to be recycled comprise a high to very high plastic-portion. From an exemplary high plastic-portion of 80 to 90%, a significant part of polymers can be recovered. In the residual material which is typically thermically further processed, would then still be up to 50% residual polymer portion.

According to a further exemplary embodiment of the invention, residual polymers from starting materials are used as adhesion promoter between cellulose fibers or as thermoplastic properties promoter within a lyocell-molded body. They stay substantially inert until the completion of a certain step in the production process. In particular, a belated reinforcement of a tissue by heat (analog to melting adhesive) may thus be achieved (e.g. non-iron shirts, pleating, etc.). For manufacturing tissues which have the property of a high dimensional stability (e.g. non-iron), an elaborate method is typically used. For example, this may be the combination of highly elaborate chemical methods. It makes the shirt look like a new one for a long term. The so-called "humid cross-linking" is also possible, wherein between the molecules of cotton cellulose, an elastic bridge is built. This bridge pulls the textile back in form after washing.

By the targeted control of the portion of residual polymers (e.g. polyurethane from the elastane from mixed textiles), according to an embodiment, a certain thermoplasticity in a lyocell fiber can be obtained, which re-supplies the corresponding portion of residual polymers from a starting material back into a lyocell-molded body via the depleting process, according to an embodiment of the invention, via a lyocell-method.

According to a further exemplary embodiment of the invention, the proper integrating behavior of certain synthetic plastics may be described by a compatibility between cellulose and further synthetic plastic, such as elastane, polyamide, or polyester. The polyethylene glycol (PEG)-portion in elastane may be responsible for the proper compatibility with the glycan ether-bond of the cellulose, due to its typical ether-structure. Thus, between the substances, a proper homogenization/mixing occurs. A corresponding integrating process, according to an embodiment, may additionally be highly dependent from the temperature of the respective method.

FIG. 1 shows a flow diagram 50 of a method of manufacturing a regenerated cellulosic molded body 102 (compare FIG. 2) from a mixed textile 110 according to an exemplary embodiment of the invention.

In the following, at first a depleting method for the mixed textile 110 is described by the blocks 52, 54, 56, and 58. The depleted and processed, respectively, mixed textile 60 may then be supplied to a lyocell-method 78. Moreover, subsequently the lyocell-method is described by the blocks 62, 64, 66, 70, 72, and 74, in order to manufacture a regenerated cellulosic molded body 102 from the depleted and processed, respectively, mixed textile 60 as starting material 110. According to a preferred embodiment, the depleted mixed textile 60 comprises substantially only cellulose. According to a further embodiment, the depleted mixed textile 60 comprises cellulose and synthetic plastic.

The mixed textile 110 comprises cellulosic fibers and fibers of at least one synthetic plastic and is present in form of old clothes and/or remains from a clothing manufacture.

As illustrated by the block 48, a mixed textile 110, in the case of old clothes, may be used by a consumer, for example as item of clothing. When the consumer disposes the item of clothing, it can be processed as post-consumer and then be used as starting material for a subsequent lyocell-method or viscose-method, wherein the former is described in more detail in the following.

Alternatively or in addition, it is also possible to use a pre-consumer mixed textile, for example offcut remains from the clothing manufacture.

At first, according to the block 52, the mixed textile 110 is supplied to the depleting process. Now, depleting 54 the mixed textile takes place, wherein at least one synthetic plastic is at least partially depleted. This may include hydrolyzing or derivatizing. Especially preferred, a solvent is used which does not degrade the cellulose. In this way, e.g. a polyester, such as PET, can be depleted from the cellulose. Between depleting 54 and the following further processing 58 of the mixed textile 110, a cleaning 56 may take place. Thereby, the cellulose can be cleaned from excessive plastic or other foreign matters. The further processing 58 in particular comprises supplying the depleted mixed textile 60 as starting material 110 to a lyocell-method.

In the following, it is described, how on basis of the depleted mixed textile 60, a molded body 102 made of cellulose according to an embodiment of the invention can be manufactured. For this purpose, the depleted mixed textile 60 is supplied to a device 100 (see FIG. 2) for performing a lyocell-method, compare reference sign 78. In the following, the depleted mixed textile 60 is denoted as starting material 110 (compare FIG. 2) for the lyocell-method.

There, first a mechanical comminuting 62 of the starting material 110 is performed by shredding. Thereby, mainly large non-cellulosic impurities may be removed from the starting material 110, for example buttons, seams and prints of the old clothes, which have been at least partially used for generating the starting material 110. By mechanically comminuting 62, the starting material 110 can be separated into single fibers, for example. It should be noted that the described mechanically comminuting 62 according to a further embodiment may also be performed during the depleting process, in particular before depleting 54.

It is also possible (see block 64) to utilize the starting material 110 which is comprising cellulose commonly with other materials which are comprising cellulose, for the subsequent lyocell-method. Thus, the starting material 110 can be mixed with a further starting material which comprises cellulose and at least one synthetic plastic, see block 64. This supplied further starting material comprises a portion of synthetic plastics, which is different from the portion of synthetic plastic in the starting material 110. Generating the regenerated cellulosic molded body can now be performed based on the starting material 110 and the further starting material, such that the regenerated cellulosic molded body 102 contains a predetermined portion of synthetic plastic. Alternatively or in addition, the further starting material may comprise remains from a clothing manufacture. Preferably, the further starting material is also a mixed textile. According to a further exemplary embodiment, the further mixed textile may be also supplied during the depleting process, in particular substantially at the same time with supplying 52 the mixed textile 110.

Directly after the mechanical comminuting 62 and directly after the mixing 64, respectively, directly solving 68 of the (pure and mixed, respectively) starting material 110 in a further solvent 116 (for example tertiary amine oxides, such as N-methylmorpholine-N-oxide (NMMO)) can be performed without chemical pretreatment in an advantageous manner. In more detail, the mechanically comminuted (and optionally mixed) starting material 110 may be directly transferred in solution, in particular without chemical cleaning and without adjusting the viscosity. In this way, the manufacturing method and recycling method, respectively, can be performed in an extraordinary simple and fast and ecological manner. It has surprisingly turned out that after mechanically comminuting 62, certain synthetic plastics (e.g. elastane, polyamide) as remaining foreign matter in the starting material 110 do not disturb the lyocell-method and do not negatively influence the quality of the recovered lyocell-cellulose. In contrast, certain amounts of certain synthetic plastics may remain in the manufactured cellulose fibers without deteriorating their properties, but to even improve them. Also certain amounts of remaining polyester do not disturb the obtained product, but may even strengthen the mechanical integrity of the molded body 102 to be manufactured.

Alternatively, the method may comprise an optional chemical cleaning 66 of the starting material 110 after mechanically comminuting 62 (or after mixing 64) and before solving 68. Such an optional cleaning 66 may comprise at least partially removing colorants by bleaching, for example. Therefore, it is possible to completely or partially discolor the starting material 110 before subsequently solving 68 the starting material 110 in solvent 116, for example in order to manufacture white or gray molded bodies 102. Alternatively or in addition, it is also possible that, in the context of the optional chemical cleaning 66, the starting material 110 (before or after solving 68 it) is at least partially freed from cross-linkers which are cross-linking fibers of the starting material 110. In applications in which such cross-linkers between the fibers of the starting material 110 are present, the starting material 110 may be completely or partially freed from these cross-linkers by means of an alkaline or acid pretreatment, for example. This additionally improves the solubility of the starting material 110. By means of cleaning 66, optionally at least a part of the synthetic plastic may be removed, if desired. For example, in this way the portion of synthetic plastic in the molded body 102 to be manufactured can be adjusted and influenced, respectively. According to a further exemplary embodiment, cleaning 56 during the depleting process may be performed in the same way. Moreover, a cleaning 66 may get unnecessary, when a cleaning 56 was already performed during the depleting process.

After solving 68 the starting material 110 insolvent (preferably NMMO), the obtained lyocell-spinning solution 104 may be pressed through one or more spinning nozzles, whereby threads and filaments, respectively, with a honey-like viscosity are generated (see block 70 concerning this spinning).

During and/or after the falling of these threads and filaments, respectively, these are brought in operational connection with an aqueous environment and are therefore diluted. Thereby, the concentration of the solvent 116 of the threads and filaments, respectively, is reduced in an aqueous fog and an aqueous liquid bath, respectively, to such an extent that the lyocell-spinning solution is transferred to a solid phase made of cellulose-filaments. In other words, a precipitating, depositing or coagulating of the cellulose-filaments occurs, see reference sign 72. Therefore, a preform of the molded body 102 is obtained.

Generating 80 the regenerated cellulosic molded body 102, in particular solving 68, spinning 70 and subsequently precipitating 72, by means of a lyocell-method, is thus performed based on a depleted mixed textile 60 as starting material 110 which itself comprises cellulose and optionally synthetic plastic.

Furthermore, the method may comprise a postprocessing 74 of the precipitated lyocell-cellulose for obtaining the molded body 102 from the preform of the molded body 102. Such a postprocessing may encompass a drying, impregnating and/or reshaping of the obtained filaments to the final molded body 102, for example. For example, the molded body 102 may be processed by means of the described manufacturing method to fibers, a foil, a tissue, a fleece, a sphere, a porous sponge, or beads and may then be supplied to a further use (see reference sign 76).

With advantage, after using the molded body 102, its cellulose (and optionally its synthetic plastic) may be again recovered by performing a further method corresponding to the process steps between reference signs 48 and 74 and between 78 and 74 (see block 80). Alternatively, the cellulose and optional further synthetic plastic of the molded body 102 may be recovered in a further method (see further block 80), for example a viscose method. This multiple repeatability of the recycling by means of repeated process stages is enabled by the knowledge that cellulose from a mixed textile, by means of at least partially, selectively depleting of plastic-portions, can be especially efficiently used in a recycling-method.

Figure 2:
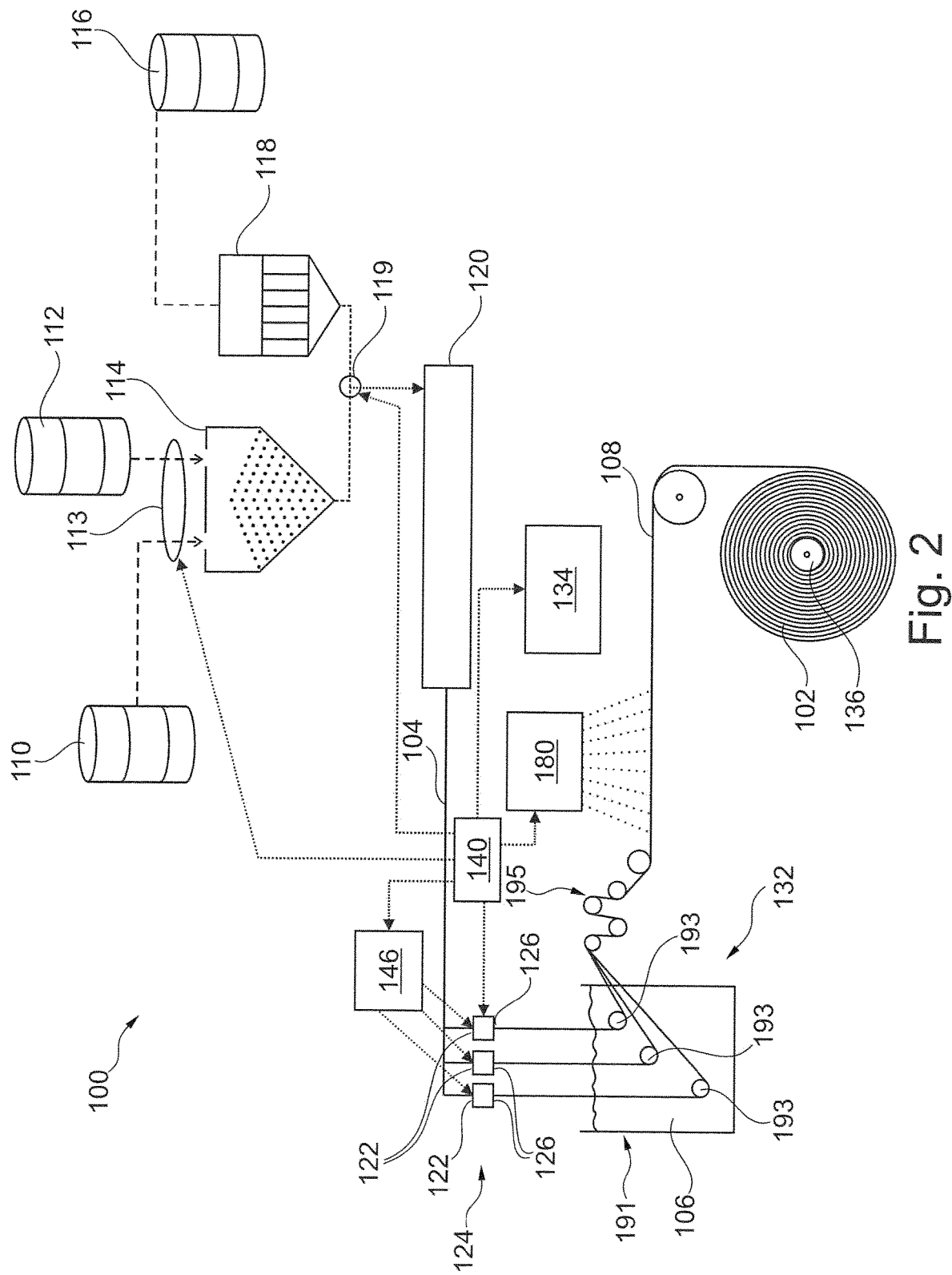
FIG. 2 shows a device for manufacturing a regenerated cellulosic molded body by a lyocell-method according to an exemplary embodiment of the invention.

FIG. 2 shows a device 100 for manufacturing a regenerated cellulosic molded body 102 by means of a lyocell-method on basis of a starting material 110 which is a depleted and processed, respectively, mixed textile 60, according to an exemplary embodiment of the invention which is described with reference to FIG. 1.

Thus, FIG. 2 shows a device 100 according to an exemplary embodiment of the invention for manufacturing a cellulose-comprising molded body 102 which may be manufactured in form of a fleece (nonwoven), as fiber, foil, sphere, textile tissue, sponge, or in form of beads or flakes, for example. According to FIG. 2, the molded body 102 is manufactured directly from a spinning solution 104. The latter is converted to cellulose fibers 108 as molded body 102 by means of a coagulation-fluid 106 (in particular made of air humidity) and/or a coagulation-bath 191 (for example a water bath which optionally comprises tertiary amine oxides such as N-methylmorpholine-N-oxide (NMMO)). By means of the device 100, a lyocell-method may be performed. In this way, substantially endless filaments or fibers 108 or mixtures of substantially endless filaments and fibers 108 with a discrete length may be manufactured as molded body 102, for example. A plurality of nozzles which respectively have one or more openings 126 (which may be also denoted as spinning holes) are provided for ejecting the lyocell-spinning solution 104.

As can be taken from FIG. 2, a starting material 110 which is based on cellulose may be supplied to a storage tank 114 via a dosing device 113.

According to an embodiment, a water ingress in the cellulose-based starting material 110 may be performed by a solvent 116 (in particular NMMO) which is described in more detail below. The cellulose-based starting material 110 itself may also contain a certain residual moisture (dry pulp frequently has a residual moisture of 5 weight percent to 8 weight percent, for example). In particular, according to the described embodiment, the starting material 110 may directly be supplied to a mixture of water and solvent 116 without pre-moistening. An optional water container 112 which is shown in FIG. 2 may then be omitted.

According to an alternative embodiment, the starting material 110 which is comprising cellulose may be additionally moistened, in order to therefore provide moist cellulose. For this purpose, water from an optional water container 112 may be supplied to the storage tank 114 via the dosing device 113. Therefore, the dosing device 113 which is controlled by a control device 140 may supply adjustable relative amounts of water and starting material 110 to the storage tank 114.

A suitable solvent 116, preferably tertiary amine oxides, such as N-methylmorpholine-N-oxide (NMMO) and an aqueous mixture of the solvent 116, respectively, for example a 76% solution of NMMO in water, is contained in a solvent container. The concentration of the solvent 116 may be adjusted in a concentrating device 118 either by supplying pure solvent or water. The solvent 116 may then be mixed with the starting material 110 with definable relative amounts in a mixing unit 119. Also the mixing unit 119 may be controlled by the control unit 140. Thereby, the cellulose-comprising starting material 110 is solved in the concentrated solvent 116 in a solving device 120 with adjustable relative amounts, whereby the lyocell-spinning solution 104 is obtained. The relative concentration ranges (also denoted as spinning window) of the components starting material 110, water, and solvent 116 in the spinning solution 104 for manufacturing cellulosic regenerated molded bodies according to the lyocell-method may be suitably adjusted as known to a person skilled in the art.

The lyocell-spinning solution 104 is supplied to a fiber generating device 124 (which may be configured with a number of spinning beams or jets 122).

When the lyocell-spinning solution 104 is guided through the openings 126 of the jets 122, it is separated into a plurality of parallel threads made of the lyocell-spinning solution 104. The described process flow transforms the lyocell-spinning solution 104 to increasingly long and thin threads whose properties may be adjusted by a corresponding adjustment of the process conditions, controlled by the control unit 140. Optionally, a gas flow may accelerate the lyocell-spinning solution 104 on its way from the openings 126 to a fiber receiving unit 132.

After the lyocell-spinning solution 104 has moved through the jets 122 and further downwards, the long and thin threads of the lyocell-spinning solution 104 interact with the coagulation-fluid 106.

In the interaction with the coagulation-fluid 106 (for example water), the solvent concentration of the lyocell-spinning solution 104 is reduced, such that the cellulose of the starting material 110 at least partially coagulates and precipitates, respectively, as long and thin cellulose fibers 108 (which may still contain residues of solvent and water).

During or after the initial formation of the individual cellulose fibers 108 from the extruded lyocell-spinning solution 104, the cellulose fibers 108 are received at the fiber receiving unit 132. The cellulose fibers 108 may immerse into the coagulation-bath 191 shown in FIG. 2 (for example a water bath optionally comprising a solvent such as NMMO) and may complete their precipitation when interacting with the liquid of the coagulation-bath 191. Depending on the process adjustment of the coagulation, the cellulose may form cellulose fibers 108 (as shown, wherein the cellulose fibers 108 may be made of one substance and integrally merged with each other ("merging"), respectively, or may be present as separated cellulose fibers 108), or a foil and a film, respectively, made of cellulose may form at the fiber receiving unit 132 (not illustrated in FIG. 2).

Thus, the cellulose fibers 108 are extruded out of the spinning nozzles of the jets 122 and are guided through the spinning bath and coagulation-bath 191, respectively (for example containing water and NMMO in low concentration for precipitation/coagulation), wherein the cellulose fibers 108 are guided around a respective deflection roll 193 in the coagulation-bath 191 and are supplied to a draw-off godet 195 outside the coagulation-bath 191. The draw-off godet 195 serves for further transport and post-stretching of the cellulose fibers 108, in order to achieve a desired titer. Downstream the draw-off godet 195, the fiber bundle made of the cellulose fibers 108 is washed in a washing unit 180, optionally scrooped and subsequently cut (not shown).

Although not illustrated in FIG. 2, the solvent 116 of the lyocell-spinning solution 104 which is removed from the cellulose fibers 108 when coagulating and in a subsequent washing in the washing unit 180, may be at least partially recovered and recycled, respectively, and may be transferred back in the storage tank 114 in a subsequent cycle.

During the transport along the fiber receiving unit 132, the molded body 102 (here in form of the cellulose fibers 108) may be washed by means of the washing unit 180, as the latter supplies a washing liquid for removing solvent residues. Thereafter, the molded body 102 may be dried.

Moreover, the molded body 102 may be made subject to a posttreatment, see the schematically illustrated posttreatment unit 134. For example, such a posttreatment may comprise a hydro-entangling, a posttreatment, a needle treatment, an impregnation, a steam treatment with a steam which is supplied under pressure and/or a calendaring, etc.

The fiber receiving unit 132 may supply the molded body 102 to a winding device 136, at which the molded body 102 may be winded. The molded body 102 may then be supplied as rolling freight to an entity which manufactures products such as wipes or textiles on basis of the molded body 102.

Figure 3:
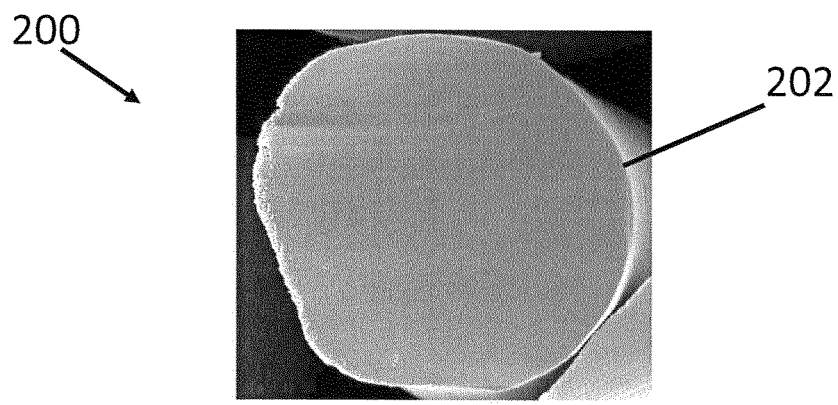
FIG. 3 shows a cellulose fiber which is manufactured by a lyocell-method.

FIG. 3 shows a cellulose fiber 200 which is manufactured by means of a lyocell-method in cross-section. The cellulose fiber 200 which is manufactured by means of a lyocell-method has a smooth round outer surface 202 and is homogenous and free from macroscopic holes, filled with cellulose material. Therefore, it can be unambiguously distinguished from cellulose fibers which are manufactured by means of a viscose-method (see reference sign 204 in FIG. 4) and from cellulose fibers of cotton plants (see reference sign 206 in FIG. 5) by a person skilled in the art.

Figure 4:
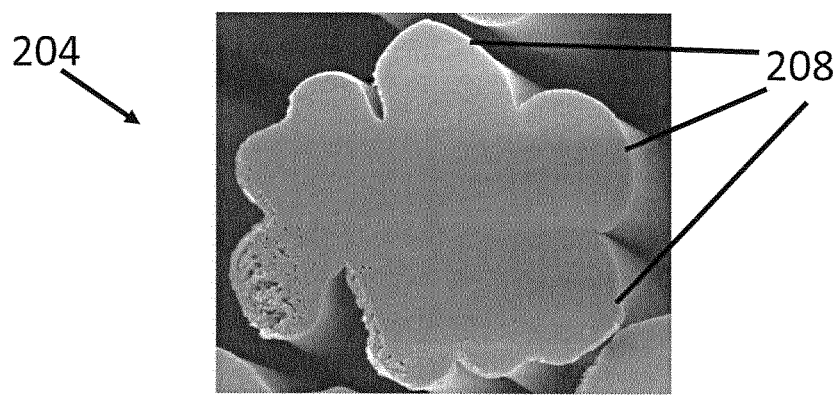
FIG. 4 shows a cellulose fiber which is manufactured by a viscose-method.

FIG. 4 shows a cellulose fiber 204 which is manufactured by means of a viscose-method in cross-section. The cellulose fiber 204 is cloud-shaped and comprises a plurality of arc-shaped structures 208 along its outer circumference.

Figure 5:
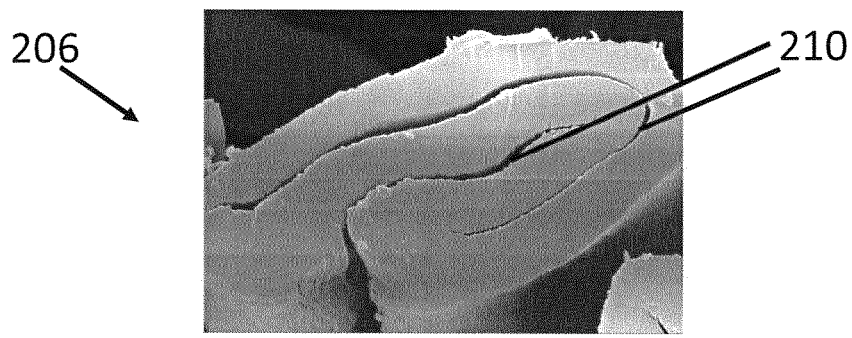
FIG. 5 shows a natural cellulose fiber of a cotton plant.

FIG. 5 shows a natural cellulose fiber 206 of a cotton plant in cross-section. The cellulose fiber 206 is kidney-shaped and comprises a lumen 210 which is free from material as a fully circumferentially enclosed hollow in an interior.

By means of the significant geometric and structural, respectively, differences of the fibers according to FIG. 3 to FIG. 5, it is possible for a person skilled in the art to unambiguously determine, for example by means of a microscope, if a cellulose fiber is formed by means of the lyocell-method, by means of the viscose-method, or naturally in a cotton plant.

In addition, it should be noted that "comprising" does not exclude other elements or steps and "a" or "an" does not exclude a multiplicity. Furthermore, it should be noted that features or steps which are described with reference to one of the above embodiments may also be used in combination with other features or steps of other above described embodiments. Reference signs in the claims should not be construed as a limitation.

The invention claimed is:

1. A method of recycling a mixed textile, wherein the method comprises:
   supplying the mixed textile, wherein the mixed textile comprises cellulosic fibers and synthetic fibers, wherein the synthetic fibers comprise at least two synthetic plastics;
   selectively depleting a first synthetic plastic from the mixed textile;
   partially retaining a second synthetic plastic in the mixed textile; and
   after selectively depleting the mixed textile, further processing the depleted mixed textile which comprises the cellulose and the second synthetic plastic.

2. The method according to claim 1, wherein the first synthetic plastic and/or the second synthetic plastic is at least one of the group which is consisting of polyester, polyamide, polyurethane, polyether, and elastane.

3. The method according to claim 1, wherein the mixed textile comprises or consists of cellulose in form of cotton.

4. The method according to claim 1, wherein the mixed textile completely or partially comprises remains from a clothing manufacture and/or used clothes.

5. The method according to claim 1, further comprising:
cleaning the cellulose, wherein the cleaning takes place between the selectively depleting and the further processing.

6. The method according to claim 1, wherein the first synthetic plastic comprises:
at least one of polyamide, polyester, polypropylene, polyurethane, or elastane.

7. The method according to claim 1, wherein the selectively depleting further comprises:
completely removing at least one of the two synthetic plastics from the mixed textile.

8. The method according to claim 1, wherein the second synthetic plastic comprises at least one of polyamide, polyester, polyurethane, or elastane.

9. The method according to claim 1, wherein the first synthetic plastic is polyamide and/or polyurethane;
wherein the second synthetic plastic is polyethylene terephthalate, PET, and/or polypropylene; and
wherein the selectively depleting further comprises:
depleting the first synthetic plastic to a first concentration value;
depleting the second synthetic plastic to a second concentration value, wherein the first concentration value is different from the second concentration value.

10. The method according to claim 1, wherein the selectively depleting further comprises at least one of:
mechanically separating; and/or
chemically separating.

11. The method according to claim 1, further comprising:
supplying at least one further mixed textile which comprises cellulose and at least one synthetic plastic,
wherein the portion of synthetic plastic in the mixed textile and in the further mixed textile is different, such that an obtained plastic-composition comprises at least one predetermined property.

12. The method according to claim 1, wherein the further processing comprises a lyocell-method or a viscose-method for generating a regenerated cellulosic molded body.

* * * * *

UNITED STATES PATENT AND TRADEMARK OFFICE
CERTIFICATE OF CORRECTION

PATENT NO. : 11,987,906 B2
APPLICATION NO. : 16/962498
DATED : May 21, 2024
INVENTOR(S) : Christoph Klaus-Nietrost et al.

It is certified that error appears in the above-identified patent and that said Letters Patent is hereby corrected as shown below:

In the Claims

In Column 20, Line 57, in Claim 1, delete "depleted mixed" and insert -- mixed --.

In Column 20, Line 61, in Claim 2, after "group" delete "which is".

In Column 21, Line 6, in Claim 6, delete "comprises:" and insert -- comprises --.

Signed and Sealed this
Twenty-fourth Day of September, 2024

Katherine Kelly Vidal
*Director of the United States Patent and Trademark Office*